Dec. 10, 1963     M. W. BEARDSLEY     3,113,750
METHOD OF PROVIDING DECELERATION AND LIFT FOR RE-ENTRY BODY
Filed Nov. 28, 1958

INVENTOR
MELVILLE W. BEARDSLEY
BY A. Fred Starobin    ATTORNEY

United States Patent Office 3,113,750
Patented Dec. 10, 1963

3,113,750
METHOD OF PROVIDING DECELERATION AND LIFT FOR RE-ENTRY BODY
Melville Whitnel Beardsley, Severna Park, Md., assignor to National Research Associates, Inc., College Park, Md., a corporation of Maryland
Filed Nov. 28, 1958, Ser. No. 776,930
11 Claims. (Cl. 244—117)

The present invention relates to space vehicles and in particular to a design of a space vehicle to provide for a change of speed and lift for the vehicle upon its re-entry into the denser atmosphere of lower altitudes.

Accordingly the present invention is directed to the control of the temperature and aerodynamic characteristics of a satellite body or other vehicle returning from extremely high altitudes or outer space. It would make possible the accurate control of satellite re-entry paths and temperatures and permit normal type landings to be made at predetermined airports or bases.

Satellite and missile studies have shown that the accuracy with which the landing spot of a satellite or missile can be determined is highly sensitive to the velocity and angle at which the body enters the atmosphere. It has been proposed that because of the anticipated lack of precision with which these factors can be controlled, an earth satellite can only be expected to land in some area, such as part of the Gulf of Mexico. The inability to control the exact landing spot of a satellite to within less than a hundred miles makes it impractical and expensive as an operational system. Variable drag devices have been proposed as a means for control of the re-entry path chiefly to reduce aerodynamic heating. Such devices give little, if any, control of the terminal landing path.

A conventional aerodynamic configuration having a useful lift-drag ratio and control surfaces to permit glide and landing maneuvers appears, in the present state of the art, to have unsatisfactory heating characteristics. Use of retractable surfaces appears to cause unacceptable increases in weight and complexity.

In general, the typical technique, proposed to accomplish the re-entry of a satellite into the earth's atmosphere consists of a rapid deceleration at great altitude so that velocity is reduced by the time the denser strata of the atmosphere is reached and aerodynamic heating remains within allowable limits throughout the re-entry path. The final landing is typically accomplished with a parachute large enough to effect acceptable impact deceleration. If there is sufficient leeway in the heating characteristics its range may be influenced by change in drag, but this is a uni-directional effect, for with a minimum drag established by the design, increase in drag can only decrease the range after re-entry into the atmosphere.

For purposes of range control it is desirable to have some means for increasing the range as well as decreasing it during the very high altitude deceleration and heat absorption phase. Since energy in the form of heat is being imparted to the vehicle during this phase, this invention utilizes the heat energy in such a manner so as to secure both lift and drag and even acceleration if desired.

Accordingly, the present invention is directed to a means of transforming the heat energy imparted to a re-entry body into usable energy by which the aerodynamic configuration of the body can be controlled, with the result that the lift-drag ratio of the body can be controlled during the period of aerodynamic heating.

It also is an object of this invention to provide a means to design satellite vehicles with aerodynamic configurations which will have satisfactory lift-drag ratios and control characteristics which will permit flight maneuvering and landing in a conventional manner.

The present invention provides a novel means of designing a vehicle in such a manner that the heat from the aerodynamic heating is absorbed by a fluid and discharged as a vapor from specially laid-out nozzle slots. The jet sheets of vapor ejected from these nozzle slots thereby change the effective aerodynamic configuration of the vehicle and in addition can be used to provide thrust which is advantageously employed in this novel and improved design.

The invention also seeks to provide a novel means of retarding the velocity of a body traveling at very high speed and shielding it from the high temperature air caused by its movement into the denser atmosphere.

Furthermore, it is an object of this invention to enable deceleration and lift to be achieved at very high altitudes so that the speed of a space vehicle may be reduced to values allowing gliding flight at good lift-drag ratios at lower altitudes whereby vehicles with good lift-drag performance in continuum atmosphere can be used for space flight since speed is reduced to give non-excessive temperatures at the time of entry into continuum atmosphere.

These as well as further advantages which are inherent in the invention will become apparent from the following description of some embodiments of the invention. In the description, reference is made to the accompanying drawings of which:

Figure 1:
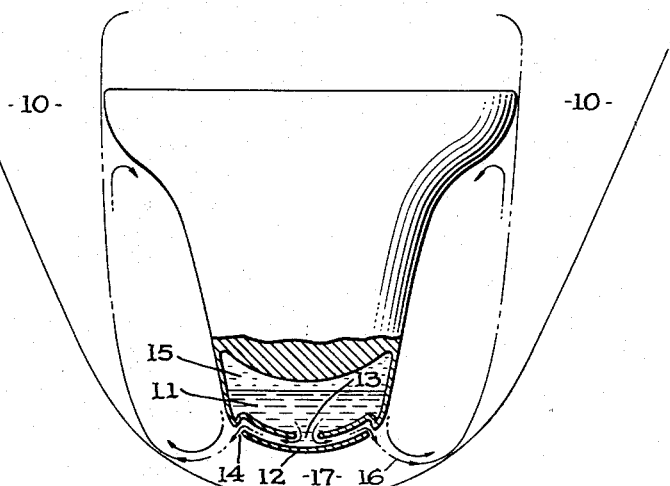
FIGURE 1 is a nose section of a satellite body showing its employment for deceleration during re-entry.

Referring first to FIGURE 1, there is illustrated the construction of the nose section 10 of a body which is employing the means of this invention solely for deceleration during re-entry. When the temperature of the nose cone 10 rises, due to the passage of nose cone 10 through the atmosphere, to a value which makes cooling necessary, a valve, not shown in the drawings, is opened to allow the fluid to flow through opening 13. This valve can be a fusible plug or other thermostatic device. The heat absorbing fluid 11, or other vaporizable substance, which may be a liquid as shown in the embodiments illustrated in the figures or may be some other vaporizable substance such as, for example, solid carbon dioxide or "Dry Ice," which will vaporize without passing through the liquid state, then passes through opening 13 into contact with the inner surface of heat transfer surface 12 and absorbs heat generated by the passage of nose cone 10 through the atmosphere. The liquid 11, thus heated, is transformed into vapor and superheated vapor as it flows outward from the center opening 13 to an annular nozzle slot 14 through which it is ejected as a superheated vapor 16. Gas 15 under pressure is used to force heat absorbing fluid 11 through center opening 13 against outside pressures. The superheated vapor 16 ejected from the annular nozzle slot 14 flows in a direction opposed to the velocity of the impinging air flow. Since the nozzle slot 14 is continuous, a continuous jet sheet 16 is formed and its shape under the influence of the surrounding air flow is similar to that of a flexible membrane. Stagnation pressure in region 17 is greater than the pressure toward the sides of the nose cone 10 and therefore the jet sheet 16 "bends" in such a manner that its change of total momentum is in equilibrium with the difference in pressure between its two sides. After it turns rearward, the jet sheet 16 tends to form a protective shroud around the sides of the body and nose cone 10, with a torroidal vortex circulation between the sides of the body 10 and the inner surface of the jet sheet 16. The curled-back jet sheet 16 gives the effect of a larger radius nose on the air flow and on shock wave 18.

Since the vapor of the jet sheet 16 is discharged substantially in the direction of motion it exerts a decelerating thrust. The amount of thrust depends upon the rate of flow and the condition of the vapor 16 at discharge. As an example, superheated steam at 500 p.s.i. absolute and 1000° F. ejected isentropically into a pressure region of 1 p.s.i., absolute gives a specific impulse of approximately 160 seconds. As applied to simple deceleration along a free-fall flight path there is the advantage of limiting of very high skin temperature to the nose area 12 where cooling is accomplished by heat transfer. Also the additional deceleration derived from forward ejection of jet sheet 16 decreases the total amount of heat absorbed for a given total deceleration.

Figure 2:
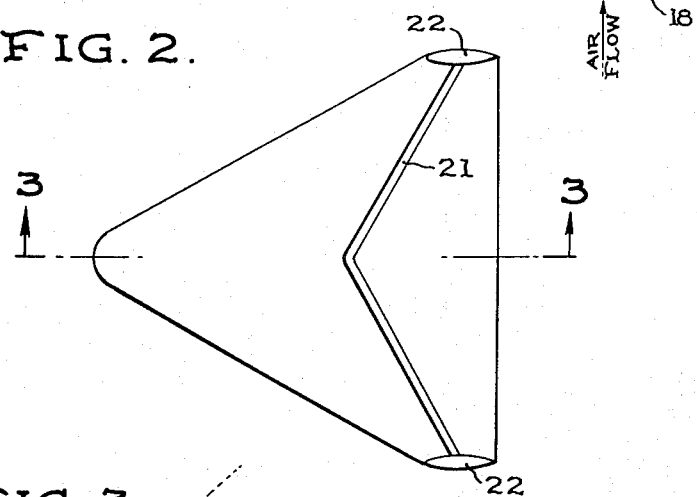
FIGURE 2 is another embodiment of the invention wherein a delta-wing body employs this novel means for deceleration and also for additional lift. A bottom view of the delta-wing is shown.

The invention as illustrated in the embodiment shown in FIGURE 1 in an example of how simple deceleration can be used so that bodies can be given lift as well as drag during the heat absorbing stage of re-entry. One embodiment applying the invention to this use is shown in FIGURE 2. Here the bottom view of a highly swept delta-wing body is illustrated showing the jet sheet nozzle slot 21 with end plates 22 to contain the pressure. The nozzle slot 21 has a controllable direction so that a decelerating and lifting reaction is produced.

Figure 3:
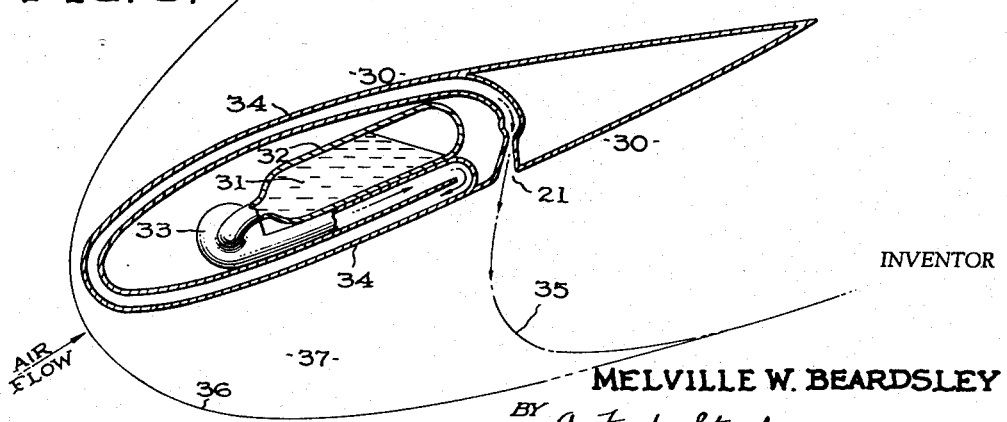
FIGURE 3 is a cross sectional view of the wing of the delta-wing body of FIGURE 2.

FIGURE 3 represents a cross-section taken at the center line 3—3. In FIGURE 3 a heat absorbing fluid 31 is contained in a tank 32 and pumped to the inner side of the heat transfer surface 34 by a high pressure pump 33. The fluid absorbs heat during its flow over the heated surface 34 and is finally ejected through nozzle slot 21 as a vapor. Nozzle slot 21 is continuous from wing tip to wing tip as illustrated in bottom view shown in FIGURE 2. Since the nozzle opening 21 is continuous between wing tips 22 the vapor is in the form of a jet sheet 35. This jet sheet 35 reacts to the surrounding air flow like a flexible wall or membrane, changing its direction of flow as determined by the difference in pressure across it. The jet sheet 35, in turn, acts upon the surrounding air flow like a substantially solid wall thus presenting a buff body shape to the flow. This buff shape causes shock wave 36 to conform around both the actual body 30 and jet sheet 35, in turn causing the high stagnation pressure in stagnation pressure region 37 to act on the lower surface of body 30 ahead of the jet sheet discharge nozzle 21. This pressure exerts an upward, lifting force in addition to a drag force on body 30. Control of the area and direction of jet nozzle 21 can be used to control both the lift-drag relationship and the longitudinal attitude of the body.

The heat absorbing fluid does not necessarily have to be confined in a tank as shown in FIGURE 3 but could just as well be stored in the wing in any other convenient manner.

A further advantage of the present invention resides in the fact that the initial weight of a re-entry body incorporating this technique would be less than other more conventional types because of the less stringent material requirements allowed by decreased temperatures over the greater part of the body surface, and the substantial elimination of heavy insulation and the need for any mass to absorb and store heat since the heat absorbed is immediately discharged in the form of superheated vapor.

It is thus apparent that the new device is a general mechanism which will be used for obtaining "pressure lift" by use of a jet sheet during the heat-absorption-deceleration phase of the re-entry of a satellite or other space vehicle.

A rearrangement of the nozzle slots in a direction so as to eject the heated and superheated vapor in a direction so as to accelerate a missile instead of for the purpose of deceleration may be made entirely in keeping with the invention. In such a case jet sheets would be ejected in approximately the same direction as the air flow past the vehicle so as to provide the vehicle with additional thrust.

It should be understood that the specific apparatus shown and described herein is intended to be representative only. Reference should therefore be made to the following claims in determining the full scope of the invention.

What is claimed is:

1. A method of changing the aerodynamic characteristics of the surface of a body moving through the atmosphere at very high speed which comprises absorbing heat generated by movement of the body through the atmosphere, transferring the heat absorbed to a fluid contained within the body, and discharging said fluid from the body in the form of a sheet and in a direction opposing the direction of movement of the body at an angle between the longitudinal axis of the body and less than a perpendicular to the longitudinal axis whereby a change is made in the resultant force acting upon the body.

2. A method of decelerating and cooling a body moving at a high velocity through the atmosphere which comprises absorbing heat from the skin of the body in a liquid thereby causing the liquid to vaporize, and ejecting the vaporized liquid from an annular discharge nozzle in a forward direction in a substantially conical surface pattern whereby a jet sheet is formed which decelerates the body, by the establishment of increased pressure on the area of the body surface surrounded by the annular discharge nozzle, and by the flow of the jet sheet in opposition to the direction of motion.

3. A method of decelerating and cooling a body moving at a high velocity through the atmosphere which comprises absorbing heat from the skin of the body in a vaporizable substance thereby causing the substance to vaporize, and ejecting the vaporized substance from an annular discharge nozzle in a forward direction in a substantially conical surface pattern whereby a jet sheet is formed which decelerates the body.

4. A vehicle for high speed travel through the atmosphere comprising a body, a heat transfer surface located on the forward section of said body, a slotted means surrounding said heat transfer surface, a heat absorbing means receiving heat from said heat transfer surface and contained in said body and channeled so as to pass beneath and in contact with said heat transfer surface and within said body to said slotted means and a fluid sheet formed by said heat absorbing means, said fluid sheet ejected away from said body into the atmosphere through said slotted means, in a forward direction in relation to the direction of movement of said body whereby the action of said fluid sheet on the atmosphere causes a deceleration of said body.

5. The vehicle of claim 4, further characterized by said fluid sheet being ejected in the direction of movement of said body at an angle between the longitudinal axis of the vehicle and less than a perpendicular to the longitudinal axis.

6. The vehicle of claim 4, further including a pumping means to move said heat absorbing means into contact with said heat transfer surface.

7. A vehicle for high speed travel through the atmosphere comprising a body, a heat transfer surface located on the forward section of said body, a slotted means located rearward of said heat transfer surface, a heat absorbing means contained in said body receiving heat from said heat transfer surface and channeled so as to pass directly beneath and in contact with said heat transfer surface and within said body to said slotted means, and a fluid sheet formed by said heat absorbing means, said fluid sheet ejected away from said body into the atmosphere, through said slotted means, in a forward direction in relation to the direction of movement of said body, at an angle between the longitudinal axis of the vehicle and less than a perpendicular to the longitudinal axis whereby the action of said fluid sheet on the atmosphere causes a deceleration of said body.

8. The vehicle of claim 7 further characterized by said heat absorbing means being a liquid.

9. The vehicle of claim 8 further including a gas under pressure in contact with said heat absorbing means thereby forcing said heat absorbing means toward said heat transfer surface and out through said slotted means against outside pressures caused by atmosphere and movement of said body.

10. A vehicle as described in claim 7 wherein said slotted means is on the underside of said body whereby both deceleration and lift of said body are affected by said fluid sheet expelled from said slotted means.

11. A vehicle comprising a body, means of absorbing heat imparted to said body by high speed movement of said body through an atmosphere, an annular nozzle slot in said body opening in a forward direction, a fluid contained within said body, means for transferring the heat absorbed to said fluid while said fluid is in contact with said means for transferring the heat, said fluid expelled in the form of a sheet in a forward direction from said nozzle slot and away from said body into the flow of atmosphere relative to the body whereby the action of said fluid sheet on the atmosphere causes a deceleration of said body.

References Cited in the file of this patent

UNITED STATES PATENTS

| | | |
|---|---|---|
| 1,376,316 | Chilowsky | Apr. 26, 1921 |
| 1,426,907 | Ramsey | Aug. 22, 1922 |
| 1,450,579 | Chilowsky | Apr. 3, 1923 |
| 2,468,820 | Goddard | May 3, 1949 |
| 2,478,792 | Trey | Aug. 9, 1949 |
| 2,873,933 | Fanti | Feb. 17, 1959 |

FOREIGN PATENTS

| | | |
|---|---|---|
| 322,228 | Great Britain | Dec. 5, 1929 |
| 512,092 | Germany | Nov. 7, 1930 |

OTHER REFERENCES

Aviation Week Magazine (New York), April 21, 1958, pages 50–52.